United States Patent [19]

Klatt

[11] Patent Number: 4,459,530

[45] Date of Patent: Jul. 10, 1984

[54] ELECTRIC ROTATING APPARATUS

[76] Inventor: Frederick W. Klatt, 36 Ripley Rd., Medford, Mass. 02155

[21] Appl. No.: 380,052

[22] Filed: May 20, 1982

[51] Int. Cl.³ .............................................. H02P 5/34
[52] U.S. Cl. .................................. 318/732; 318/705; 318/737
[58] Field of Search ............... 318/715, 737, 731, 732, 318/705, 49; 310/102 R, 111, 112

[56] References Cited

U.S. PATENT DOCUMENTS

| | | | |
|---|---|---|---|
| 3,017,553 | 1/1962 | Homan | 318/737 |
| 3,621,350 | 11/1971 | Masterman | 318/341 X |
| 3,859,578 | 1/1975 | Botvinnik et al. | 318/732 |

OTHER PUBLICATIONS

"New Micro-Controls for AC Drives," Coughlin, Vince; Design Engineering; Feb., 1982, pp. 58-61.
"Love AC-T-230, A New Low-Cost Variable Speed Drive for AC Motors," Love AC Advertisement, pp. 1-6.
"AC Motor Drives," Machine Design, May 14, 1981; pp. 98-99.
"Linear and Switching ICs Control Motors Efficiently," Electronic Design; Apr. 29, 1981; pp. 197-203.

Primary Examiner—G. Z. Rubinson
Assistant Examiner—Patrick Keane
Attorney, Agent, or Firm—Wolf, Greenfield & Sacks

[57] ABSTRACT

An electric rotating machine which is adapted to function as a motor or a generator without any major electrical or mechanical modifications. This machine has associated therewith, microprocessor controls. There is provided two balanced phase synchronous electrical rotating machines whose rotors are attached to a common axial. One of the two balanced phase electric rotating machines is electrically and mechanically designed to be a balanced phase synchronous power motor or power generator at the utility frequency while the other balanced phase electric rotating machine is electrically and mechanically designed for a higher frequency. Depending on the modulation type of signal, applied to the stator of the second machine, each of the electrical phase windings of the two rotors are either electrically wired together or electronically connected by a demodulator circuit. At any rotational speed of the common axial, the electrical and mechanical arrangement of this invention synchronizes the rotating magnetic fields of the rotor and stator of both machines. As a result, by controlling the phase, amplitude, and frequency of the modulation signal with the microprocessor controls, numerous motor and generator functions can be achieved.

13 Claims, 3 Drawing Figures

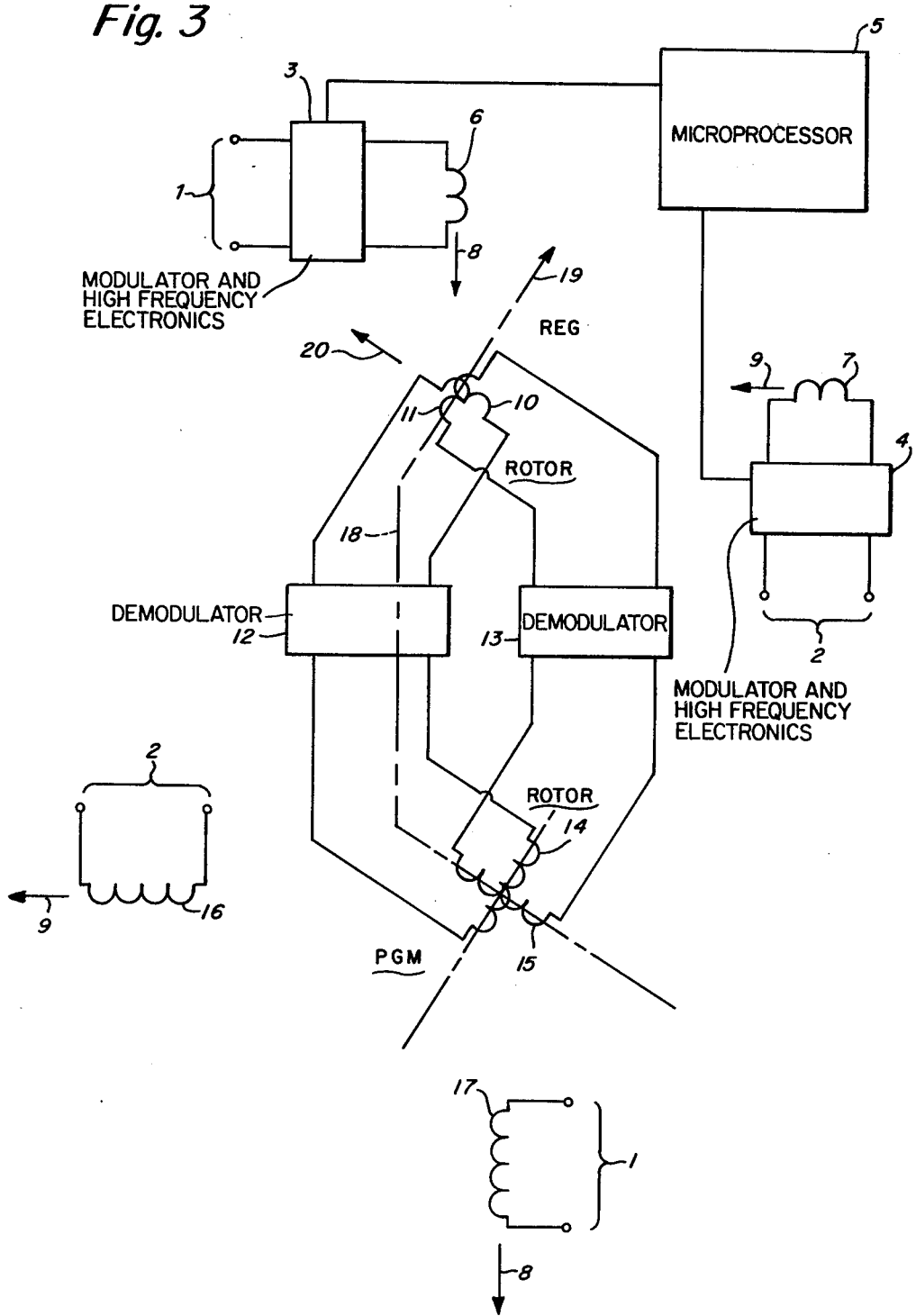

ELECTRIC ROTATING APPARATUS

PRIOR ART

U.S. Pat. Nos. 3,467,844; 3,239,701 and 3,956,629 disclose basic synchronous machines in which the rotor of the motor is supplied with a D.C. supply so as to avoid slip rings and brushes and allowing synchronous operation only at one speed.

In prior patents where they do employ a second rotor/stator combination, it is generally not multiphase and is generally rectified to supply D.C. to the rotor; a purpose in which a permanent magnet would suffice. U.S. Pat. No. 3,383,532 has generator section whose axial is separate from the motor section. U.S. Pat. No. 3,383,532 uses a centrifugal movement of a liquid metal such as mercury to change the operating characteristics of the machine.

OBJECTS OF THE INVENTION

One object of the present invention is to provide an improved electric rotating machine which is readily adapted for use either as an electric motor or electric generator without requiring any major mechanical or electromechanical alterations to switch from motoring to generating.

Another object of the present invention is to provide an improved electric rotating machine which readily provides for either motor or generator operation requiring only minor electronic control circuit alterations or software program alterations to bring about such changes between motoring and generating operation.

A further object of the present invention is to provide an improved synchronous rotating machine that is readily adapted to operate on conventional power line frequency say from D.C. to 400 Hertz which furthermore is operable as a generator designed to develop any conventional line frequency.

Still another object of the present invention is to provide an improved electric rotating machine which operates as a motor in which the rpm and power factor can be easily varied and controlled.

Still a further object of the present invention is to provide an improved electric rotating machine having a power factor of 1 in which the current is in phase with the voltage which is an important consideration for a motor efficiency.

Another object of the present invention is to provide an improved electric rotating machine in which in operation as a motor the rotating machine has control over its angular displacement.

A further object of the present invention is to provide an improved electric rotating machine that does not require any brushes or slip rings and which is particularly adapted for applications such as in electric cars and boats, electro magnetic transmissions, and wind mills.

Still another object of the present invention is to provide an improved electric rotating machine which operates so as to provide synchronous operation over a range of speeds.

BRIEF DESCRIPTION OF THE DRAWINGS

Numerous other objects, features and advantages of the invention should now become apparent upon a reading of the following detailed description taken in conjunction with the accompanying drawing, in which:

FIG. 3 portrays a two-phase system in accordance with the present invention including a microprocessor and associated controls.

THE INVENTION

The present invention relates in general to an electric rotating apparatus or machine, and pertains more particularly to an electric rotating machine which may be in the form of either an electric motor or an electric generator and which is particularly adapted for complimentary use with an electronic controller or microprocessor for the control of certain parameters of the electric rotating machine. In accordance with the invention the control results in efficient and optimum motor or generator operation. The preferred embodiment of the invention is constructed employing synchronous rotating machine concepts.

A synchronous rotating machine or apparatus is known to be very efficient at a singular angular velocity referred to as the synchronous speed. A synchronous rotating machine has a stationary winding called the stator winding and a rotating winding called a rotor winding. In general, there is one stator winding for each phase of the electrical power supplied to the stator. Also, there is one rotor winding for each phase.

By way of example consideration is now give to a balanced two phase machine in which the drive voltages and current amplitudes of each phase are equal and the drive voltage and current phases are equally spaced in time. Although a two phase machine is considered it is understood that principles may also be applied in single phase or balanced multiple phase electric power machines.

Figure 1:
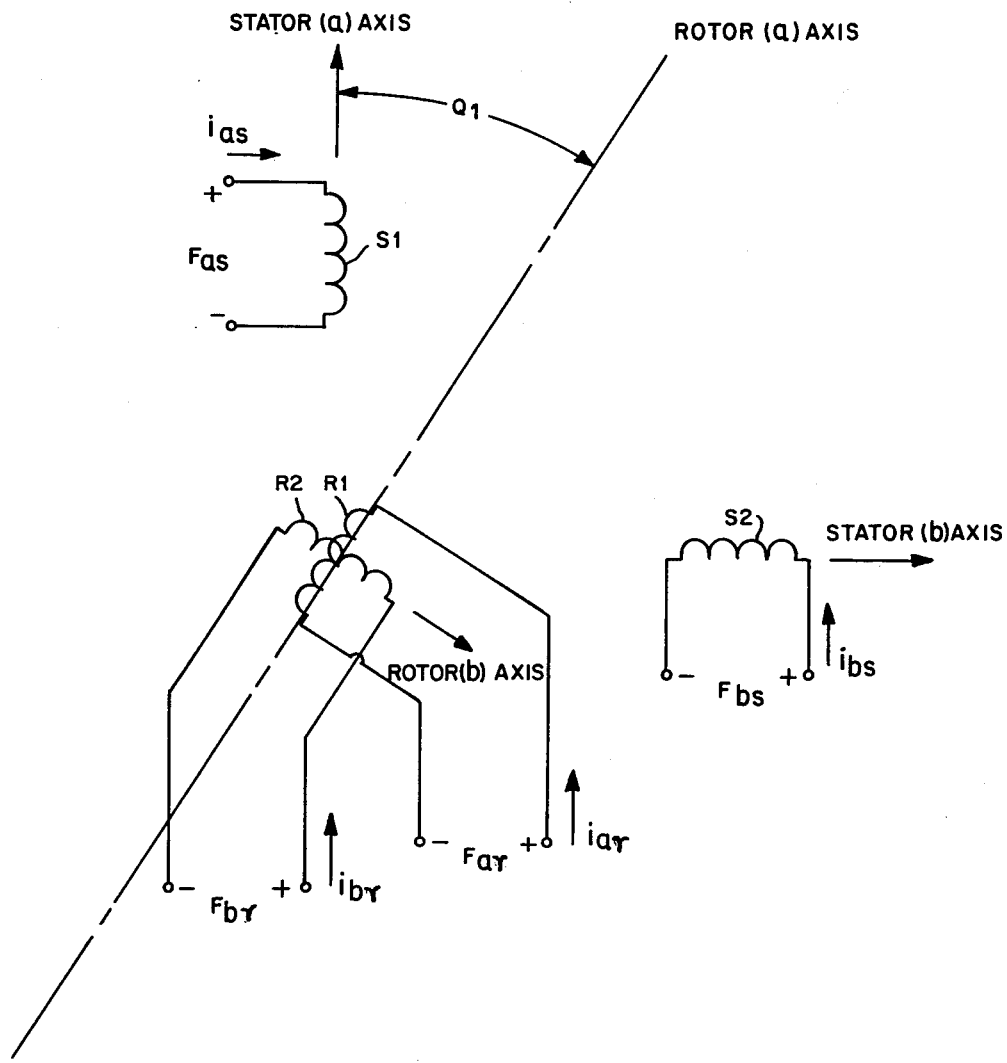
FIG. 1 schematically illustrates a balanced two-phase synchronous rotating machine with a pair of stator windings and a pair of rotor windings.

The mathematical relations for the balanced two phase machine illustrated in FIG. 1 are:

$$F_{as} = L_s I_{as} + M I_{ar} \cos Q - M I_{br} \sin Q \quad \text{(equ. 1)}$$

$$F_{bs} = L_s I_{bs} + M I_{ar} \sin Q + M I_{br} \cos Q \quad \text{(equ. 2)}$$

$$F_{ar} = L_r I_{ar} + M I_{as} \cos Q + M I_{bs} \sin Q \quad \text{(equ. 3)}$$

$$F_{br} = L_r I_{br} - M I_{as} \sin Q + M I_{bs} \cos Q \quad \text{(equ. 4)}$$

$$T_e = M[(I_{ar}I_{bs} - I_{br}I_{as}) \cos Q - (I_{ar}I_{as} + I_{br}I_{bs}) \sin Q] \quad \text{(equ. 5)}$$

where;

$L_{as,bs}$ = inductance of each of the stator windings,
$L_{ar,br}$ = inductance of each of the rotor windings,
$M = 24$ mutual inductance between the stator and motor windings,
$F_{as,ar,bs,br}$ = magnetic flux of windings, also;

$$Q = \omega_n t + Q_1 \quad \text{(equ. 6)}$$

where;

$\omega_n$ = mechanical angular velocity of the rotor,
$Q_1$ = angular displacement of the rotor in reference to the stator,
$t$ = time, $T_e$ = torque.

As indicated in FIG. 1, there are a pair of stator windings S1 and S2 and a pair of rotor windings R1 and R2. Let it be assumed that the stator and rotor windings are excited with balanced two phased current sources 90° apart. In this case the following equations apply.

$$I_{as} = I_s \cos \omega_s t,$$

$$I_{bs} = I_s \sin \omega_s t,$$

$$I_{ar} = I_r \cos \omega_r t, \text{ and}$$

$$I_{br} = I_4 \sin \omega_r t.$$

where;
$\omega_r$ = electrical angular frequency applied to the rotor,
$\omega_s$ = electrical angular frequency applied to the stator.

Using the above current expressions along with solving the foregoing equations 1–5, results in the following mathematical relations:

$$F_{as} = L_{as}I_s \cos \omega_s t + MI_r \cos [(\omega_r + \omega_n)t + Q_1], \quad \text{(equ. 7)}$$

$$F_{bs} = L_{bs}I_s \sin \omega_s t + MI_r \sin [(\omega_r + \omega_n)t + Q_1], \quad \text{(equ. 8)}$$

$$F_{ar} = L_{ar}I_r \cos \omega_r t + MI_s \cos [(\omega_s - \omega_n)t + Q_1], \quad \text{(equ. 9)}$$

$$F_{br} = L_{br}I_r \sin \omega_r t + MI_s \sin [(\omega_s - \omega_n)t + Q_1], \quad \text{and (equ. 10)}$$

$$T_e = MI_r I_s \sin [(\omega_n - \omega_s + \omega_r)t + Q_1] \quad \text{(equ. 11)}$$

Now, from equation 11 it can be seen that the average torque results only if:

$$(\omega_n - \omega_s + \omega_r) = 0, \text{ or} \quad \text{(equ. 12)}$$

$$T_e = -MI_r I_s \sin Q_1. \quad \text{(equ. 12A)}$$

Thus, if the relationship of equation 12 holds and furthermore if $Q_1 = 90°$, then the torque is maximum or equal to $MI_r I_s$. When equation 12 is satisfied the voltage relations of the stator voltages (voltage = dF/dt) are as follows:

$$V_{as} = \omega_s L_s I_s \sin \omega_s t + \omega_s MI_r \sin (\omega_s t + Q_1) \quad \text{(equ. 13)}$$

$$V_{bs} = -[(\omega_s L_s I_s \cos \omega_s t + \omega_s MI_r \sin (\omega_s t + Q_1)] \quad \text{(equ. 14)}$$

Also, the rotor voltage given by the following equations:

$$V_{ar} = \omega_r L_r I_r \sin \omega_r t + \omega_r MI_r \sin (\omega_r t + Q_1) \quad \text{(equ. 15)}$$

$$V_{br} = -[(\omega_r L_r I_r \cos \omega_r t + \omega_r MI_s \cos (\omega_r t + Q_1)] \quad \text{(equ. 16)}$$

From the above equation then in particular equation 12, it can be seen that the synchronous rotating machine functions as a very efficient motor or generator by supplying D.C. current to the rotor winding so that $\omega_r = 0$, and A.C. current is applied to the stator winding. This has the effect of reducing equation 12 to the following equation:

$$\omega_n = \omega_S$$

This equation essentially expresses that the mechanical angular velocity of the rotor is equated to the electrical angular frequency applied to the rotor and if balanced polyphased currents of constant frequency are supplied to the stator windings and if the axial rotational speed is varied, then balanced polyphased motor currents of variable frequency would have to be supplied to satisfy equation 12.

In conventional electrical power utilities which have balanced polyphase sinusoidal sources of constant frequency of (60 Hertz in the United States), the design of balanced polyphase sources of variable frequency to power the rotor for variable axial speeds is energy wasteful and economically prohibitive. Therefore, synchronous motors in industry essentially have no starting torque but are externally rotated to synchronous speed wherein the aforementioned equation 12 is satisfied and torque prevails.

In synchronous rotating machines, if the mechanical rotation is zero ($\omega_n = 0$), the synchronous rotating machine appears to be a true electrical transformer where $\omega_r = \omega_s$. However, the torque equation is satisfied and torque exists between the stator and motor windings.

In a synchronous rotating machine as illustrated in FIG. 1, if a power source of constant frequency is applied to the stator and if the angular rotation of the axial is varied from 0 rpm to synchronous speed, then the frequency of the rotor current is varied from $\omega_s$ to 0 (D.C.) hertz respectively, thus satisfying equation 12. In this instance the torque to rotate the axial is dependent on the mutual inductance and the polyphase current magnitudes.

As the parameter $Q_1$ which is the angular displacement of the rotor with reference to the stator, changes to $-Q_1$, the torque ($-MI_r I_s \sin (-Q_1)$) becomes positive and the synchronous machine functions as a generator instead of a motor. As the parameter $Q_1$ is varied the currents ($I_{as,bs,ar,br}$) may be in phase, or lead, or lag their respective voltages ($V_{as,bs,ar,br}$). Therefore te A.C. power factor of the synchronous machine is adjustable to be essentially one. If the current amplitudes or voltage amplitudes are varied while maintaining the balanced polyphase concepts, the torque and power factor can be varied.

Now, in accordance with the invention, the electric rotating machine employs two synchronous machines which are attached to the same axial and therefore rotate at the same angular velocity. One of the synchronous machines is referred to herein as a rotor excitation generator (REG) in that it excites the rotor of the second synchronous machine with the proper frequency to satisfy electrical rotation. The second synchronous machine is referred to as a power motor/generator (PGM) because it actually supplies the positive or negative mechanical power.

Figure 2:
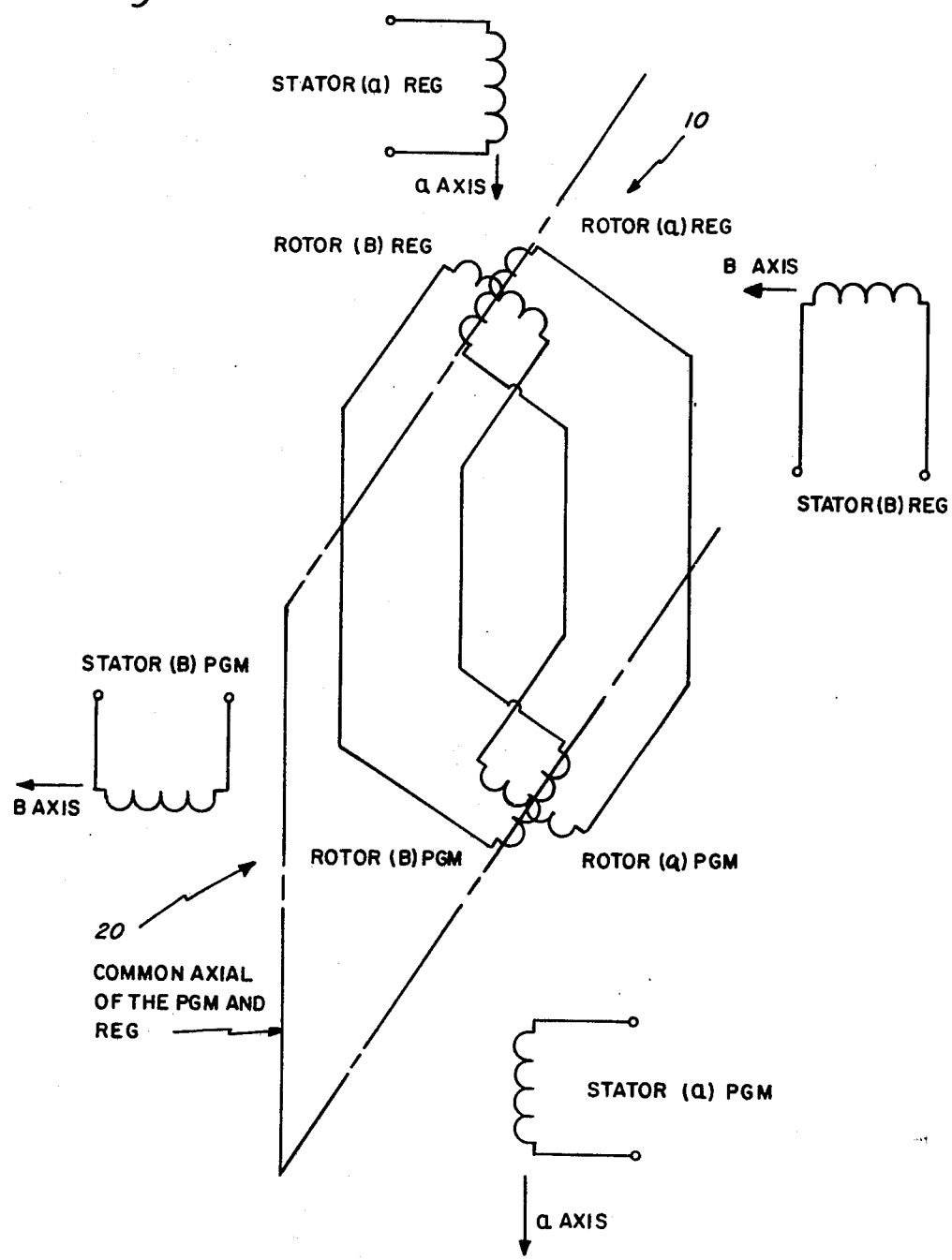
FIG. 2 schematically represents the concepts of the present invention employing two synchronous machines including a rotor excitation generator and a power motor/generator.

For a better understanding of the principles of the invention reference is now made to FIG. 2 which shows both of the synchronous machines 10 and 20. The machine 10 is the aforementioned rotor excitation generator (REG). The machine 20 is the aforementioned power motor/generator (PGM). If the stator winding of both the rotor excitation generator and the power motor/generator are supplied with the same frequency ($\omega_s$), the relationship expressed in equation 12 is always satisfied for both REG 10 and PGM 20, if no rotation of the axial exists. As the mechanical angular velocity of the rotor increases the rotor excitation generator supplies a frequency of:

$$\omega_{sREG} - \omega_{nREG} = \omega_{rREG}$$

The above frequency is supplied from the rotor winding to the power motor/generator rotor winding, thereby satisfying the relationship:

$$(\omega_{sPGM} - \omega_{nREG} = \omega_{rPGM} = \omega_{rREG});$$

$$\omega_{nPMG} = \omega_{nREG}; \quad \omega_{sPGM} = \omega_{sREG}$$

for the power motor/generator.

Essentially, the power motor/generator (PMG) is fooled into believing it is turning at the proper speed for synchronous operation. As ($\omega_n$) approaches ($\omega_s$) then ($\omega_r$) approaches zero and the rotor excitation generator supplies D.C. to the power motor/generator.

The voltage amplitude is constant in all A.C. utility power line applications. Thus, the inductance and mutual inductance of both the rotor excitation generator and the power motor/generator have to be equal because the currents are to be balanced polyphase currents in order to satisfy the forementioned equations. As a result no substantial external useful mechanical torque is developed because:

$$T_{ePGM} = T_{eREG}$$

Essentially, the arrangement functions as a power transformer.

Since the current or voltage amplitudes are to be balanced, then in accordance with equation 12A, only the mutual inductance of the REG can be decreased to reduce the torque of the REG.

In order to provide the useful mechanical torque there is employed in accordance with the invention a modulated high frequency power source where frequency is orders of magnitude higher than the utility supply frequency. This signal is supplied to the stator of the rotor excitation generator. This modulation is preferably a pulse width modulation but could also be amplitude modulation, frequency modulation or other forms of modulation that may be developed from the utility line supply using presently available electronic designs.

Because of the proportionately higher frequency employed in comparison with the frequency of the standard A.C. line, proportionately smaller rotor and stator windings (analogous to lower inductance (L) and lower mutual inductance (M)) can be used for the rotor excitation generator with no loss in the magnitudes of the voltage or currents supplied to the power motor/generator, since electro magnetic induction is a function of frequency.

By modulating the power supply to the stator of the REG and then demodulating the output of the REG by instrinsic means (the inherent filtering capabilities of electrical-mechanical aspects of the motor), or by electronic means (some type of electronic demodulator), the output of the REG rotor looks like an apparent sinusoidal waveform equal to the frequency of the power/motor generator power source. Also, because the windings are small, the inductance and mutual inductance of the windings of the rotor excitation generator will be smaller than the windings of the power motor/generator and therefore, the negative torque of the REG is proportionately smaller than the positive torque of the power generator and the total torque of the system chiefly depends on the power/motor generator:

$$T_{total} = T_{PGM} - T_{REG}; \quad T_{PGM} >> T_{REG}$$

Changing the phase of the modulation of the high frequency power source supplied to the rotor excitation generator is analogous to changing the parameter $Q_1$ (the angular displacement between the rotor and stator). Changing the parameter $Q_1$ has a impact on the torque and current magnitude, power factor, etc. Changing the frequency of modulation has an impact on the frequency of the A.C. power utility needed for synchronous operation.

Pulse width modulation is a preferable modulation technique because the modulation frequency and the power amplitude may be changed by changing the pulse width and the phase of the modulation cycle may be changed by offsetting the pulses. Developing the modulated frequency for the purpose of this invention may easily be accomplished with todays high power semiconductors and with the use of a microprocessor. In this connection reference is now made to FIG. 3.

The schematic diagram of FIG. 3 portrays a two phase device. However, it is understood that the principles of the invention may also be applied analogously for polyphase devices.

In FIG. 3, there is described a two phase system in which a first phase is coupled to the input terminals 1 and a second phase coupled to the input terminal 2. The first phase of the electrical power utility is supplied to the modulator and high frequency electronics 3 which in turn drives the stator winding 6 of the rotor excitation generator (REG). The stator winding 6 is associated with the stator axis 8 (axis A). The phase 1 signal at terminal 1 is also shown in FIG. 3 driving the power motor/generator stator winding 17 of the stator axis 8 (axis A).

The second phase of the electrical power utility is supplied to the modulator and high frequency electronics 4 whih drives the rotor excitation generator stator winding 7 of the stator axis 9 (axis B). Also, the second phase at terminal 2 is shown directly driving the power generator/motor stator winding 16 of the stator axis 9 (axis B). The phases supplied to the electronic units 3 and 4 are not necessarily used for power but are used as phase indicators for the control electronics. In such an embodiment, the driving electronics to windings 6 and 7 is supplied with DC power converted from the multiphase source. FIG. 3 also shows the microprocessor 5 which includes related software/firmware (program) and peripheral electronics for controlling the electronic units 3 and 4. The REG stator windings 6 and 7 induce electrical power in the REG rotor winding 11 of the rotor axis 19 (axis A) and also the REG rotor winding 10 of the rotor axis 20 (axis B). Each phase of the induced electrical power directly drives the PGM rotor windings 14 and 15 or, alternatively, each phase may be demodulated by demodulators 12 and 13 either by the intrinsic electromagnetic characteristics of the motor or by the use of an electronic demodulator as depicted in FIG. 3. This electrical power is supplied to the PGM rotor winding 14 of the rotor axis A and the PGM rotor winding 15 of the motor axis B. The windings of the PGM and REG rotors and associated equipment are in a common axial 18 and thus rotate at the same speed. It is also noted that the size of the REG windings are smaller than the PGM windings.

It can be seen that the machine of this invention can be run on D.C. By using trigonometric fourier series principles, a periodic square wave can be converted to an orthogonal set of sinusoidals with odd frequency harmonics. Because of the linearity of the electro magentic relations developed earlier, a set of balanced polyphased square wave currents driving the stator of the rotor excitation generator section again supply the proper frequency components to the rotor of the power motor/generator section for synchronous electro mechanical rotation. Since a periodic square wave (chopped D.C.) can be easily produced from D.C. power or rectified A.C. power, the machine can be run on D.C. power.

In summary, for any rotational speed of the axial ($\omega_n$) the rotor excitation generator section consistently supplies a frequency to the rotor of the power motor/generator section equal to ($\omega_{sREG} - \omega_n$), and if the frequency of modulation supplied to the stator of the motor excitation generator section ($\omega_{sREG}$) is equal to the A.C. frequency supplied to the stator of the power motor/generator section ($\omega_{sPGM}$), then synchronous operation results for any rotational speed of the axial.

By supplying the rotor excitation generator with a modulated high frequency power source, the torque of the rotating machine in accordance with the invention is chiefly due to the power motor/generator. Also, the physical size of the machine is dependent primarily upon the requirements for the power motor/generator.

In accordance with the invention the various type of modulation supplied to the machine control the axial rotational speed, the axial torque, the axial displacement, and the electrical power factor. This modulation control may be by controlling the phase of the modulation, the frequency of the modulation or the amplitude of the modulation. Likewise, the phase, frequency and amplitude parameters of modulation control the switching between the motor or generator modes, the electrical power when in the motor or generator mode, and the operational frequency of the motor or generator. Also, when generating, the A.C. output can be easily synchronized to the electrical utility power network.

The production and control of the high frequency modulated signal supplied to the rotor excitation generator, as well as the monitoring of the motor or generator parameters, readily lends itself to the use of electric power semiconductors and an electronic microprocessor.

For a given horsepower rating, half of the electrical power passes through the rotor excitation generator to the rotor of the power motor/generator, and the remainder of the electrical power is supplied to the stator of the power motor/generator. Therefore, semiconductors of half the electrical power rating can be used compared to a conventional electronic motor controller which controls conventional A.C. induction or synchronous motor.

Moreover, it is preferred in accordance with the invention, as illustrated in FIG. 3 that the electrical and physical size of the REG windings are smaller than the PGM windings. Because of the smaller electrical size of the REG windings, a higher frequency source is supplied to the REG and the torque of the REG is smaller than that of the PGM. The high frequency pulses supplied to the REG limit the power dissipated by the semiconductors and thus increase their efficiency. Also, with the use of fast switching semiconductors, control of the currents and voltages supplied to the REG can be precisely controlled. Also, the REG is very compact in comparison to the PGM.

What is claimed is:

1. An electric rotating machine comprising;
   a first electric rotating means having at least one stator winding and associated rotor winding,
   a second electric rotating means having at least one stator winding and associated rotor winding,
   both said first and second electric rotating means having a common axial so as to provide rotation at the same angular velocity,
   means coupling the rotor winding of the first electric rotating means to the rotor winding of the second electric rotating means whereby the rotor winding of the second electric rotating means is excited from the first electric rotating means,
   means coupling a first frequency signal to the stator winding of the first electric rotating means,
   means coupling a second frequency signal to the stator winding of the second electric rotating means,
   whereby synchronous overall operation occurs for any rotational speed of the axial,
   said first frequency being substantially greater than said second frequency whereby the torque of the machine is chiefly dependent on the second electric rotating means,
   said first frequency coupling means comprising modulating means for receiving a third frequency signal substantially the same as said second frequency signal and modulating said first frequency by said third frequency,
   said first electric rotating means having windings which are physically and electrically smaller than those of the second electric rotating means whereby the physical size of the overall machine is dependent primarily upon the second electric rotating means.

2. An electric rotating machine as set forth in claim 1 wherein said electric rotating means both have a pair of stator windings and associated rotor windings for two phase operation.

3. An electric rotating machine as set forth in claim 1 wherein said modulation is one of phase, amplitude, pulse width, or frequency modulation.

4. An electric rotating machine as set forth in claim 3 wherein said means coupling the rotor winding of the first synchronous rotating means to the rotor winding of the second synchronous means comprises a demodulating means.

5. An electric rotating machine as set forth in claim 1 wherein said electric rotating means have a proper number of stator windings and associated rotor windings to satisfy multiphase operation including at least one winding per phase.

6. An electric rotating machine as set forth in claim 1 wherein said means coupling the rotor winding of the first synchronous rotating means to the rotor winding of the second synchronous means comprises only the electro mechanical demodulating means of the physical motor.

7. An electric apparatus comprising;
   a first electric machine having at least one stationary winding and associated moving winding,
   a second electric machine having at least one stationary winding and associated moving winding,
   both said first and second electric machines having a common carrier so as to provide motion at the same linear velocity,
   means coupling the moving winding of the first electric machine to the moving winding of the second electric machine whereby the moving winding of the second electric machine is excited from the first machine, means coupling a first frequency signal to the stationary winding of the first electric machine, means coupling a second frequency signal to the stationary winding of the second electric machine, whereby synchronous overall operation occurs for any moving speed of the carrier, said first frequency being substantially greater than said second frequency whereby the torque of the machine is chiefly dependent on the second electric machine, said first frequency coupling means comprising modulating means for receiving a third frequency signal substantially the same as said second frequency signal and modulating said first frequency by said third frequency, said first electric machine having windings which are physically and electrically smaller than those of said second electric machine whereby the physical size of the overall machine is dependent primarily upon the second electric machine.

8. An electric apparatus as set forth in claim 7 wherein both said first and second electric machines have a predetermined number of stationary windings and associated moving windings to satisfy multiphase operation including one winding per phase.

9. An electric apparatus as set forth in claim 8 wherein said third frequency of modulation comprises multiple signals corresponding to the number of phases.

10. An electric apparatus as set forth in claim 7 wherein said modulation is at least one of phase, amplitude, pulse width, or frequency modulation.

11. An electric apparatus as set forth in claim 7 wherein said means coupling the moving winding of the first electric machine to the moving winding of the second electric machine comprises a demodulating means.

12. An electric apparatus as set forth in claim 7 wherein said means coupling the moving winding of the first electric machine to the moving winding of the second electric machine comprises only the electromechanical demodulation means of the physical electric apparatus.

13. An electric apparatus as set forth in claim 7 wherein each phase of the modulation of said first frequency signal is applied to one of the phase windings of the stator of said first electric machine to satisfy single or multiphase operation.

* * * * *